United States Patent [19]

Fajeau et al.

[11] Patent Number: 4,587,079
[45] Date of Patent: May 6, 1986

[54] SYSTEM FOR THE EMERGENCY COOLING OF A PRESSURIZED WATER NUCLEAR REACTOR CORE

[75] Inventors: Maurice Fajeau; Sylvain Croxatto, both of Pertuis, France

[73] Assignee: Commissariat a l'Energie Atomique, Paris, France

[21] Appl. No.: 351,453

[22] Filed: Feb. 23, 1982

[30] Foreign Application Priority Data

Feb. 24, 1981 [FR] France ................................. 81 03632

[51] Int. Cl.⁴ ............................................. G21C 15/18
[52] U.S. Cl. ................................... 376/282; 376/298; 376/299; 376/405; 376/406
[58] Field of Search ............... 376/282, 298, 299, 405, 376/406

[56] References Cited

U.S. PATENT DOCUMENTS

| | | | |
|---|---|---|---|
| 3,625,817 | 12/1971 | Anderson | 376/282 |
| 3,702,281 | 11/1972 | Birts et al. | 376/282 |
| 3,900,365 | 8/1975 | Barclay et al. | 376/219 |
| 4,028,179 | 6/1977 | Colgate | 376/298 |
| 4,123,327 | 10/1978 | Sugisaki et al. | |
| 4,288,997 | 9/1981 | Friesen et al. | 376/272 |
| 4,322,267 | 3/1982 | Kinoshita et al. | 376/299 |

FOREIGN PATENT DOCUMENTS

| | | |
|---|---|---|
| 2346868 | 3/1975 | Fed. Rep. of Germany . |
| 1597057 | 7/1970 | France . |
| 2150856 | 4/1973 | France . |
| 2172152 | 9/1973 | France . |
| 2179839 | 11/1973 | France . |
| 2449947 | 9/1980 | France . |
| 1297951 | 11/1972 | United Kingdom ................ 376/298 |

Primary Examiner—Deborah L. Kyle
Assistant Examiner—Richard W. Wendtland
Attorney, Agent, or Firm—Kerkam, Stowell, Kondracki & Clarke

[57] ABSTRACT

An emergency cooling device for a water-cooled nuclear reactor comprises a heat exchanger integrated into a reactor vessel and submerged in the reactor water. One of the ends of the circuit of this exchanger is connected by means of a three-way valve to the upstream valve, while its other end is connected across a downstream valve and a second untreated water-operated cooling exchanger to the cold water tank.

7 Claims, 1 Drawing Figure

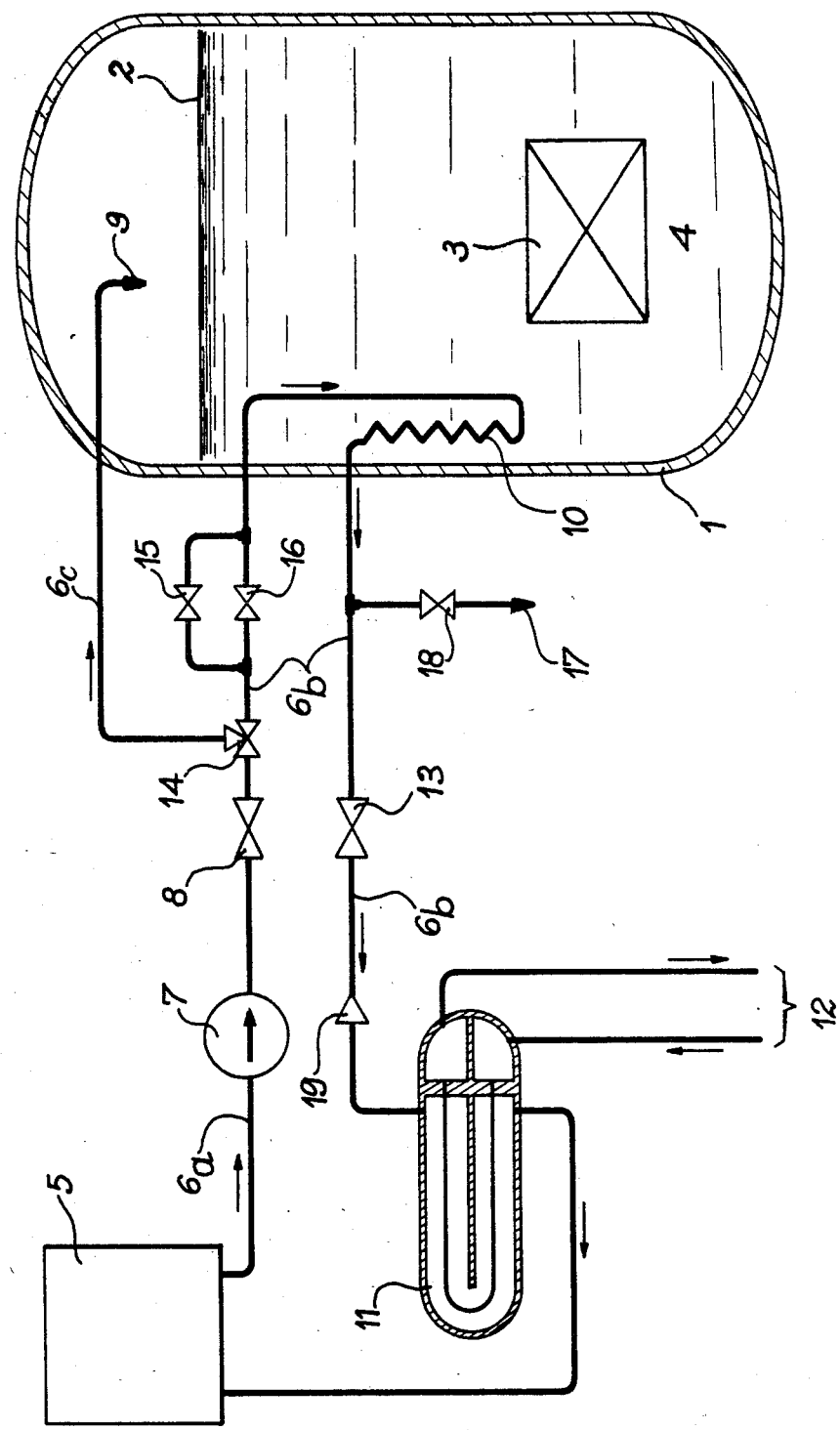

SYSTEM FOR THE EMERGENCY COOLING OF A PRESSURIZED WATER NUCLEAR REACTOR CORE

BACKGROUND OF THE INVENTION

The present invention relates to a system for the emergency cooling of the core of a pressurized water nuclear reactor.

As is known, in this reactor type, the core is submerged in ordinary hot water at approximately 300° C., under a high pressure of approximately 155 bars, it being of vital importance that in all circumstances the core remains submerged in this water during operation or after reactor shutdown. Furthermore, it is important that the water can always be cooled to prevent any abnormal heating of the fuel which, in extreme cases, with all or part of the core dried up, could be subject to a temperature rise and at least partly melt causing unacceptable, dangerous and irreversible damage.

In the presently known installations, there is generally an emergency injection system for preventing the draining of the vessel containing the core or connecting the core to the primary circuit in the case of a leak. There is also an emergency and shutdown cooling system enabling the removal of the residual power and the cooling of the primary circuit, so that cold shutdown can take place.

The emergency injection system generally comprises high pressure pumps, medium pressure accumulators and low pressure pumps.

Up to medium pressure, the emergency and shutdown cooling system uses a system for the water supply and steam extraction from generators, as well as a direct cooling system for the primary circuit using a special exchanger for the final cooling.

The pressurized water-filled accumulators are linked with the primary cooling circuit of the reactor via isolating valves sensitive to a given lower value of the pressure in the primary circuit. The water filling the accumulators is pressurized by nitrogen.

The known device has a number of disadvantages. Thus, the injection of water from the emergency cooling accumulators of the core does not necessarily take place at the most favourable moment. Thus, when the pressure drop in the primary circuit results from a relatively unimportant piping break or failure which tends to spontaneously close again, there can be a significant drainage or emptying of the primary circuit without an adequate drop in the primary pressure to start the emptying of the accumulators or the emergency low pressure injection. The primary circuit can then be filled with emergency high pressure pumps provided for this purpose, but they draw their supplies from tanks with a limited capacity and in no case constitute the final cooling sources. In addition, the emptying of the accumulators is linked with a primary circuit pressure value and not with a critical value of the water level in the vessel, which is the most important physical quantity with regards to the need for filling the primary circuit with water.

Moreover, the injection of water into the primary circuit is generally terminated by an injection into it of nitrogen used for pressurizing the water in the accumulators. This gas can then be trapped either in the inverted U-tubes of the steam generators, or in the upper parts of the hot branches of the primary circuit when the steam generators are of the "single pass" type, in which the primary fluid enters the upper end of the generator and leaves at its lower end. Thus, in both cases there is a reduction of the efficiency of the cold source formed by the steam generators.

BRIEF SUMMARY OF THE INVENTION

The present invention relates to an emergency cooling system obviating certain of the disadvantages of the prior art referred to hereinbefore and making it possible to eliminate the emergency high pressure accumulators or emergency high pressure injection pumps by rapidly lowering the pressure of the primary circuit to below the threshold for starting the emergency low pressure injection as soon as the pressure in the primary circuit rises due to a cooling deficiency.

Therefore, the present invention specifically relates to an emergency cooling system for a water-cooled nuclear reactor of the type comprising in per se known manner a device for injecting low pressure emergency water into the reactor vessel from a cold water tank connected to the top of said vessel by a pipe on which are provided in series at least one low pressure pump and at least one normally close upstream valve, wherein it comprises at least one heat exchanger integrated into the vessel and normally submerged in the reactor water, the circuit of said exchanger being connected at one of its ends via a three-way valve to the said upstream valve, and at the other of its ends, to a downstream valve, to a second untreated water-operated cooling heat exchanger, and to said cold water tank.

The establishment, in accordance with the invention of a closed circuit between the cold water tank for emergency low pressure water injection and a heat exchanger located in the reactor vessel water permits, in conjunction with a cooling exchanger positioned outside the reactor and in series in said same circuit, the supplying at all times of all the frigories required in the vessel for cooling the primary water, whilst obtaining the condensation of the steam formed as a result of a primary leak of varying gravity. As condensation and then depressurization take place no matter what the evolution of the leak, the pressure in the vessel drops until it reaches the threshold as from which there is a spontaneous injection of emergency low pressure water.

According to an interesting development of the emergency device according to the invention, two valves in parallel, the one which is normally closed having a much higher flow rate than the other which is normally open, are positioned on the connecting pipe of the end of the integrated exchanger connected to the three-way valve. As a result, it is possible to have, as desired, a greater or lesser flow rate in the integrated exchanger as a function of the quantity of frigories which it is desired to supply to the vessel during normal cooling operations. The normally open valve is generally used at the start of the cooling phase and the second, normally closed valve with a much higher flow rate is only opened on reaching the end of cooling.

According to the invention, a leak detector, which, if necessary, serves as a drain for the integrated exchanger circuit, is positioned between the exchanger and the normally closed downstream isolating valve.

Finally, the emergency cooling device according to the invention is advantageously supplemented by the presence between the normally closed downstream isolating valve and the second cooling exchanger, of a water hammer or pressure surge-preventing valve which, on starting, during the operations connected with the filling of the system with water, prevents a definite hydraulic shock in the high pressure part of the circuit.

Among the important advantages of the present invention are the possibility of using a single cold water tank of the type provided hitherto for low pressure injections for bringing about the shutdown and emergency cooling, as well as the emergency water injection of a water-cooled nuclear reactor, during a random failure of the primary circuit leading to an important cooling problem. In particular, this cooling device makes it possible to eliminate the emergency high pressure injection accumulators, whose disadvantages have been referred to hereinbefore, or the emergency high pressure injection pumps conventionally provided hitherto in the primary circuit of all nuclear reactors of this type. If desired, this device also makes it possible to cool the water of the primary circuit following a normal shutdown of the reactor, i.e. fulfils the standard function of cooling the reactor on shutdown when, after lowering the control rods and stopping the chain reaction, there continues to be an important release of calories under the effect of the induced radio activity continuing in the core.

DESCRIPTION OF THE DRAWING AND PREFERRED EMBODIMENTS

The invention is described in greater detail hereinafter relative to an embodiment of the emergency cooling device according to the invention and with reference to the attached drawing, which diagrammatically shows a water-cooled nuclear reactor vessel equipped with the device according to the invention.

The following description relative to the single drawing concerns a water-cooled pressurized water reactor (PWR) because it is in this case that the present invention finds its most immediate application. However, it is obvious that other water controlled reactor types and in particular boiling water reactors could also be equipped with a cooling device according to the invention.

In the drawing, it is possible to see the vessel 1 of a PWR filled with untreated water up to a level 2 corresponding to a deteriorated situation where, as a result of an accidental leak, part of the primary water has already been lost. Vessel 1 contains the core 3 of a nuclear reactor submerged in the primary water 4 thereof. The primary heat exchange circuit of the reactor is not shown, because it is not necessary for the understanding of the present invention. However, it is obvious that in per se known manner such a reactor has a primary circuit equipped with at least one high pressure pump for permanently circulating the primary water towards the steam generators. Also not shown is a pressurization system which maintains a high pressure of about 160 bars in vessel 1 to prevent water 4 from boiling.

In known manner, the installation comprises a cold water tank 5 connected by a first circuit or pipe 6a to a low pressure pump 7, a normally closed upstream (with respect to the reactor) isolating valve 8, a pipe 6c, and an emergency water injection nozzle 9 permitting the injection of emergency low pressure water into reactor core 1.

According to the invention, the aforementioned known installation is supplemented by an emergency cooling system comprising a second circuit 6b connecting the outlet of the upstream valve 8 to the cold water tank 5 via two heat exchangers 10 and 11 in series. The first heat exchanger 10 is integrated into vessel 1 of the reactor and is immersed in the cooling water 4 thereof, and the second heat exchanger 11 serves as the cooling means for cooling water flowing through the first heat exchanger, and is supplied with cold untreated water by means of a double pipe 12. A normally closed downstream (with respect to the reactor) isolating valve 13 is positioned between first exchanger 10 and second exchanger 11. The inlet of exchanger 10 opposite to exchanger 11 is connected to the upstream valve 8 via a three-way valve 14 and a system of two valves 15 and 16 in parallel. The normally open valve 15 permits a relatively low flow rate compared with that of the normally closed valve 16.

The installation is also supplemented by a leak detector 17, equipped with a valve 18, the assembly being positioned between the downstream isolating valve 13 and the first integrated exchanger 10. A pressure surge-preventing valve 19 is advantageously positioned between the downstream isolating valve 13 and the cooling exchanger 11.

The aforementioned emergency cooling device functions in the following way. When reactor 3 is operating normally and the primary circuit is cooled by the passage of primary water through steam generators, the valves 8, 13, 18, 16 are closed. There is no emergency injection via nozzle 9 and no cooling by integrated exchanger 10.

If, as a result of a break or failure of a primary circuit, part of the water 4 of vessel 1 is at least partly lost, the emergency cooling flow in circuits 6a, 6b is put into action by opening valves 8 and 13 and by introducing cooling water 12 into the second cooling exchanger 11. Thus, the cold water circulating in integrated exchanger 10 lowers the temperature of water 4 in vessel 1, which leads to a condensation of the steam formed and consequently to a reduction of the pressure within vessel 1.

Thus, the system of three valves 14, 15 and 16 makes it possible to adapt the cooling device according to the invention to the following three standard situations.

When the reactor is shut down for a routine operation (e.g. for the discharge of fuel), it is necessary to cool the water 4 of vessel 1 to compensate the heating which the radioactivity of core 3 continues to produce. However, as in this case there is no urgency, a relatively slow cooling will suffice and this can be brought about by opening the normally closed valve 16, so that exchanger 10 operates at the discharge pressure of pump 7. In a standard example and with this pressure at approximately 10 bars, the water remains liquid in exchanger 10 and the relatively moderate temperature variation $\Delta t$ between the water traversing exchanger 10 and the water 4 in the vessel makes it possible to operate exchanger 10 with minimum mechanical stresses.

When a random accident or incident occurs in the reactor and causes a shutdown necessitating emergency cooling, it is necessary to obtain a more vigorous cooling of the water 4 of vessel 1. To this end, and with valve 16 again closed, the normally open valve 15 which has a low flow rate is allowed to operate as a pressure drop generator of circuit 6b, so that the pressure of the cooling water in exchanger 10 drops sufficiently to enable this water to boil, and exchanger 10 then operates under two-phase conditions. When this has been done, the temperature of the water-vapour mixture in exchanger 10 does not exceed 100° C. This leads to a greater temperature variation Δt than in the previous case between the water traversing exchanger 10 and the water 4 of vessel 1 and, due to the boiling of the cooling water in exchanger 10, there is a greater absorption of the calories supplied by water 4 of vessel 1 because they are in large part used for bringing about the aforementioned boiling.

When the pressure in vessel 1 drops below the discharge pressure of pump 7, the three-way valve 14 automatically opens, whilst directing the cold water towards pipe 6c and consequently stops the cooling by exchanger 10. This automatically leads to the injection of emergency water by pipe 6c and nozzle 9 into the actual vessel 1.

It should be finally noted that the normally open valve 15 is only closed if a leak is detected on exchanger 10, so as to prevent any communication between the cooling circuit and the water 4 of vessel 1.

It is also pointed out that the upstream isolating valve 8 and downstream isolating valve 13 separate the high pressure part on the side of vessel 1 and the low pressure part on the side of exchanger 11 and tank 5. This means that the high pressure in vessel 1 and which via pipe 6c and nozzle 9, could enter part of the pipe 6b, is automatically stopped by the two valves 8 and 13. This provides an interesting protection for the second cooling exchanger 11 due to the low pressure in the cooling circuit at said exchanger 11. Thus, in the case where the tubes of the latter were subject to a leak, there would be no leak of the cooling circuit towards the untreated water 12 and in actual fact the water 12 would enter the cooling circuit, which ensures that there is no radioactive leaks from exchanger 11 to untreated water 12. This same pressure ratio also ensures that there is no untimely draining or emptying of the cold water tank 5 into the untreated water 12, in the event of a leak in one of the tubes of exchanger 11.

We claim:

1. In a water-cooled nuclear reactor of the type having a reactor vessel and a device for injecting low pressure emergency water into the top of the reactor vessel from a cold water tank, an emergency cooling system being a closed circuit comprising, in series, a low pressure pump connected to the cold water tank, a normally closed upstream valve connected to the pump, a first heat exchanger integrated into the reactor vessel and normally submerged in the reactor water, a three-way valve connected to the upstream valve and to a normally closed valve and a normally open valve which are connected in parallel between the three-way valve and an inlet of the first heat exchanger, the normally closed parallel-connected valve having a much higher flow rate than the normally open parallel-connected valve, a normally closed downstream valve connected to an outlet of the first heat exchanger, and a second heat exchanger connected to the downstream valve and to said cold water tank, the second heat exchanger being supplied with a secondary cooling water flow therethrough for removing heat from water flowing in said closed circuit, and the water injection device being connected to the three-way valve, the three-way valve being operable to supply water from the cold water tank alternatively to said water injection device or to said first heat exchanger.

2. An emergency cooling system according to claim 1 wherein a leak detector is provided between the outlet of the first heat exchanger and to the downstream valve.

3. An emergency cooling system according to claim 1, wherein a pressure surge device is provided between the second heat exchanger and the downstream valve.

4. In a water-cooled nuclear reactor of the type having a device for injecting emergency replacement water under low pressure into a vessel of the reactor from a cold water tank, an emergency cooling system comprising, in series, a low pressure pump, an upstream normally closed valve, a heat exchanger integrated with the reactor vessel and normally immersed in the water in the reactor vessel, the pump, the upstream valve, and the heat exchanger being connected to said cold water tank so as to form a closed circuit, a three-way valve disposed between the upstream valve and the heat exchanger and being connected to the emergency water injection device, the three-way valve being operable to connect alternatively the water injection device or the heat exchanger to the pump such that water can be supplied from the cold water tank by the pump to either the water injection device or the heat exchanger, and a normally closed valve and a normally open valve connected in parallel between the heat exchanger and the upstream valve, the normally closed valve having a substantially higher flow rate than the normally open valve.

5. An emergency cooling system according to claim 4 further comprising a downstream valve connected to an outlet of the heat exchanger, and another heat exchanger external of the reactor vessel and connected to the downstream valve, the other heat exchanger being connected to the cold water tank and being supplied with a secondary flow of cooling water so as to remove heat from the water flowing through said closed circuit.

6. An emergency cooling system according to claim 4 wherein the parallel connected valves are operable so as to vary the flow rate of water flowing in the closed circuit.

7. An emergency cooling system according to claim 6, wherein said normally open valve has a flow rate selected such that it serves as a pressure drop on the outlet of the pump to enable the water flowing in said closed circuit to boil upon the temperature in the reactor vessel exceeding a predetermined temperature to increase the heat absorption between the water in the closed circuit and the water in the reactor vessel.

* * * * *